United States Patent
Weilnau et al.

(10) Patent No.: US 10,628,151 B2
(45) Date of Patent: Apr. 21, 2020

(54) SYSTEMS AND METHODS FOR USAGE DRIVEN DETERMINATION OF UPDATE CRITICALITY

(71) Applicant: Dell Products L.P., Round Rock, TX (US)

(72) Inventors: Wayne R. Weilnau, Austin, TX (US); Robert A. Contreras, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 15/674,279

(22) Filed: Aug. 10, 2017

(65) Prior Publication Data
US 2019/0050221 A1 Feb. 14, 2019

(51) Int. Cl.
G06F 9/44 (2018.01)
G06F 8/658 (2018.01)
G06F 16/2455 (2019.01)
H04L 29/08 (2006.01)

(52) U.S. Cl.
CPC .......... G06F 8/658 (2018.02); G06F 16/2455 (2019.01); H04L 67/34 (2013.01)

(58) Field of Classification Search
CPC ...... G06F 8/658; G06F 17/30477; G06F 8/65; G06F 8/654; G06F 8/68; G06F 11/1433; H04L 41/082; H04L 67/04; H04L 67/1095; H04L 67/303; H04L 67/34; H04W 8/205; H04W 24/02
USPC ........................................................ 717/170
See application file for complete search history.

(56) References Cited

U.S. PATENT DOCUMENTS

| | | | | |
|---|---|---|---|---|
| 2012/0084766 A1* | 4/2012 | Shanmugam et al. | .... | G06F 8/65 717/171 |
| 2014/0115574 A1* | 4/2014 | Valentine et al. | ...... | H04L 67/34 717/172 |
| 2016/0232116 A1* | 8/2016 | Bone et al. | ......... | H04L 67/1095 |

* cited by examiner

*Primary Examiner* — Qing Chen
*Assistant Examiner* — Mohammed N Huda
(74) *Attorney, Agent, or Firm* — Jackson Walker L.L.P.

(57) ABSTRACT

In accordance with embodiments of the present disclosure, an information handling system may include a host system comprising a host system processor and a management controller communicatively coupled to the host system processor and configured to provide management of the information handling system. The management controller may be further configured to read a features-to-fixes database having one or more entries, each entry of the features-to-fixes database setting forth an association between an information handling resource feature and one or more firmware fixes, read a usage database having one or more entries, each entry of the usage database setting forth usage of information handling resource features by the information handling system, and compare entries of the features-to-fixes database and the usage database to determine at least one of a criticality and an applicability of the one or more firmware fixes to the information handling system.

14 Claims, 4 Drawing Sheets

SYSTEMS AND METHODS FOR USAGE DRIVEN DETERMINATION OF UPDATE CRITICALITY

TECHNICAL FIELD

The present disclosure relates in general to information handling systems, and more particularly to methods and systems for providing usage-driven determination of update criticality for firmware and software of information handling resources of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include a number of hardware components, each of which may operate in accordance with firmware or other executable code. Often, updates to such firmware are required or advised in order to correct errors in the firmware code, add security to firmware code, and/or to improve features of the firmware code or hardware devices.

When updates are released by a hardware vendor, the hardware vendor often assigns a criticality to the update. Such criticality may be based on the various fixes or improvements delivered in the update. Such determination of criticality is often not very rigorous and often does not take into account an end user's usage environment and inventory of hardware components. Thus, a firmware update that may indeed be critical for one end user of an information handling system may not be critical for another end user of another information handling system.

SUMMARY

In accordance with the teachings of the present disclosure, the disadvantages and problems associated with existing approaches for firmware updates in an information handling system may be reduced or eliminated.

In accordance with embodiments of the present disclosure, an information handling system may include a host system comprising a host system processor and a management controller communicatively coupled to the host system processor and configured to provide management of the information handling system. The management controller may be further configured to read a features-to-fixes database having one or more entries, each entry of the features-to-fixes database setting forth an association between an information handling resource feature and one or more firmware fixes, read a usage database having one or more entries, each entry of the usage database setting forth usage of information handling resource features by the information handling system, and compare entries of the features-to-fixes database and the usage database to determine at least one of a criticality and an applicability of the one or more firmware fixes to the information handling system.

In accordance with these and other embodiments of the present disclosure, a method may include reading a features-to-fixes database having one or more entries, each entry of the features-to-fixes database setting forth an association between an information handling resource feature and one or more firmware fixes, reading a usage database having one or more entries, each entry of the usage database setting forth usage of information handling resource features by an information handling system, and comparing entries of the features-to-fixes database and the usage database to determine at least one of a criticality and an applicability of the one or more firmware fixes to the information handling system.

In accordance with these and other embodiments of the present disclosure, an article of manufacture may include a non-transitory read-only computer-readable medium and computer-executable instructions carried on the computer-readable medium, the instructions readable by a processor, the computer-readable medium integral to the processor. The instructions, when read and executed, may cause the processor to read a features-to-fixes database having one or more entries, each entry of the features-to-fixes database setting forth an association between an information handling resource feature and one or more firmware fixes, read a usage database having one or more entries, each entry of the usage database setting forth usage of information handling resource features by an information handling system, and compare entries of the features-to-fixes database and the usage database to determine at least one of a criticality and an applicability of the one or more firmware fixes to the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
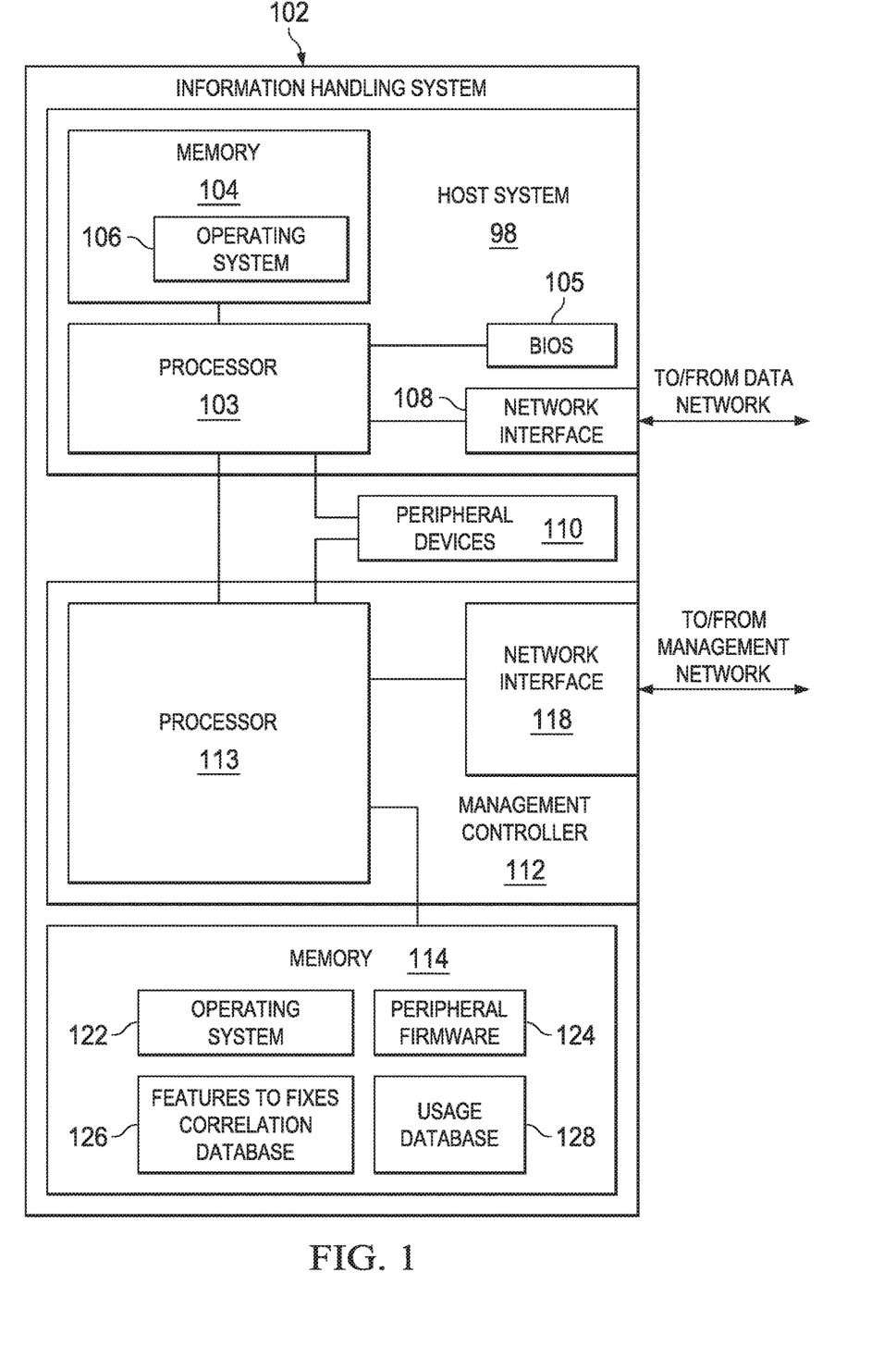
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, one or more peripheral devices 110 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

One or more peripheral devices 110 may be communicatively coupled to processor 103 and processor 113 of management controller 112 and may generally include any information handling resource. A peripheral device 110 may also be coupled to processor 103 and/or processor 113 via an inter-integrated circuit (I2C) bus and/or via a PCIe bus.

Management controller 112 may be configured to provide management facilities for management of information handling system 102. Such management may be made by management controller 112 even if information handling system 102 is powered off or powered to a standby state. Management controller 112 may include a processor 113 and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

As shown in FIG. 1, processor 113 of management controller 112 may be communicatively coupled to a memory 114. In FIG. 1, memory 114 is shown as external to management controller 112. In some embodiments, memory 114 may be integral to management controller 112.

Memory 114 may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112. For example, as shown in FIG. 1, memory 114 may have stored thereon software components including operating system 122 and firmware 124. As shown in FIG. 1, memory 114 may also have stored thereon a features-to-fixes correlation database 126 and a usage database 128. In some embodiments, features-to-fixes correlation database 126 may not be persisted in memory 114, but may be used at runtime from a source image.

Operating system 122 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 122, in order for carrying out the functionality of management controller 112. In addition, operating system 122 may include all or a portion of a network stack for network communication via a network interface (e.g., network interface 118 for communication over an out-of-band management network). Although operating system 122 is shown in FIG. 1 as stored in memory 114, in some embodiments operating system 122 may be stored in storage media accessible to processor 113, and active portions of operating system 122 may be transferred from such storage media to memory 114 for execution by processor 113.

Firmware 124 may comprise any program of executable instructions, or aggregation of programs of executable instructions, configured to, when executed, provide control, monitoring, and/or data manipulation of one or more peripheral devices 110, BIOS 105, and/or one or more other information handling resources of information handling system 102, in order to enable such information handling resources to carry out their functionality. In operation, management controller 112 may receive firmware and/or updates to firmware for one or more information handling resources and store such received firmware and/or firmware updates to memory 114 as firmware 124.

Features-to-fixes correlation database 126 may comprise a list, database, map, table, or other suitable data structure defining correlations between individual firmware features and individual firmware fixes made as part of firmware updates. Although shown separate from firmware 124 in FIG. 1, in some embodiments, features-to-fixes correlation database 126 or individual entries thereof may be stored as a part of firmware 124 after download of updates by management controller 112. An example process that may be used to build features-to-fixes correlation database 126 or individual entries thereof is shown in FIG. 2 and described in greater detail below.

Figure 3:
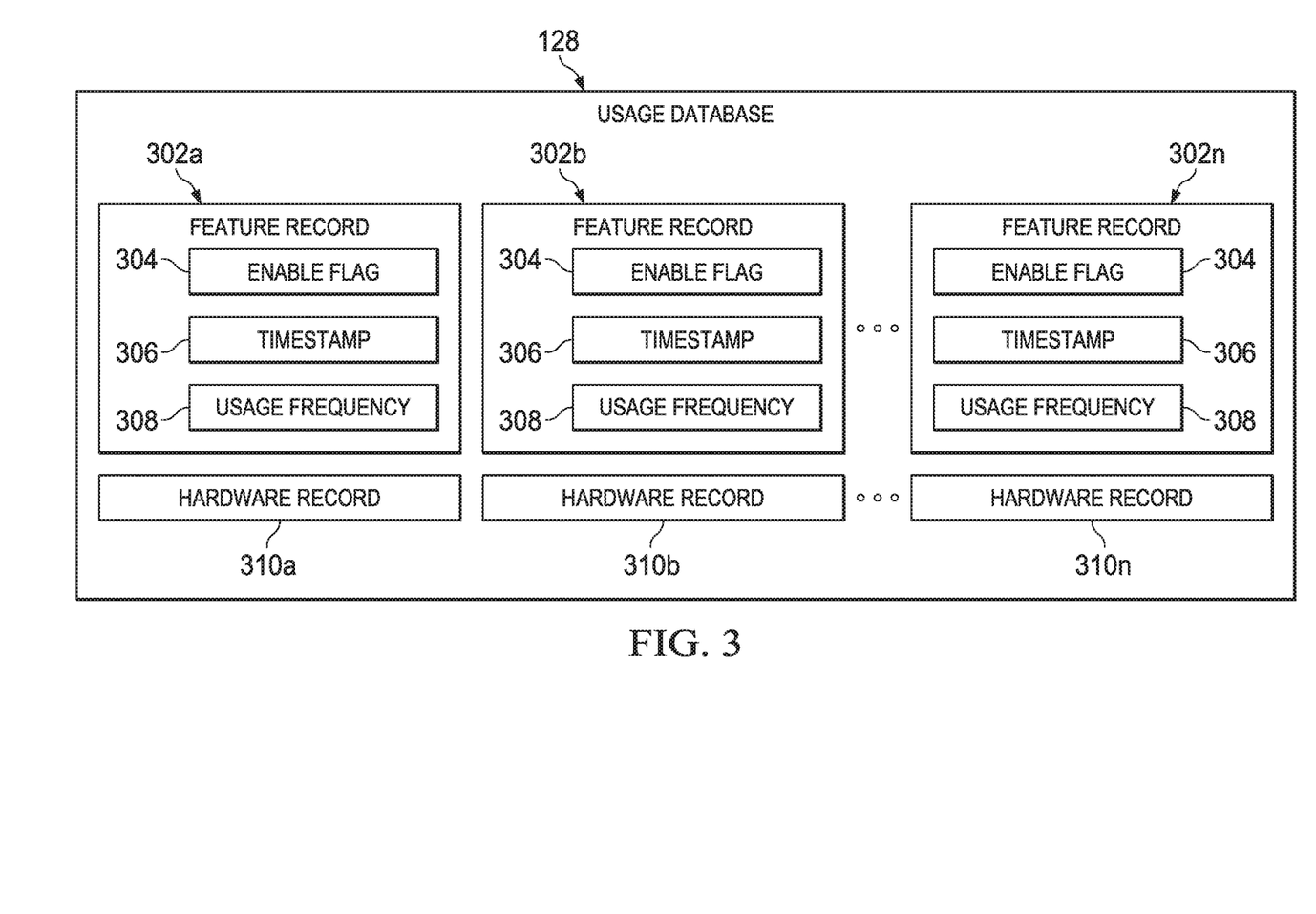
FIG. 3 illustrates a block diagram of an example usage database, in accordance with embodiments of the present disclosure.

Usage database 128 may comprise a list, database, map, table, or other suitable data structure setting forth various information handling resources present in information handling system 102 and/or information regarding usage of individual features of firmware executed by individual information handling resources. An example usage database is shown in FIG. 3 and described in greater detail below.

In addition to processor 103, memory 104, network interface 108, peripheral devices 110, management controller 112, and memory 114, information handling system 102 may include one or more other information handling resources.

Figure 2:
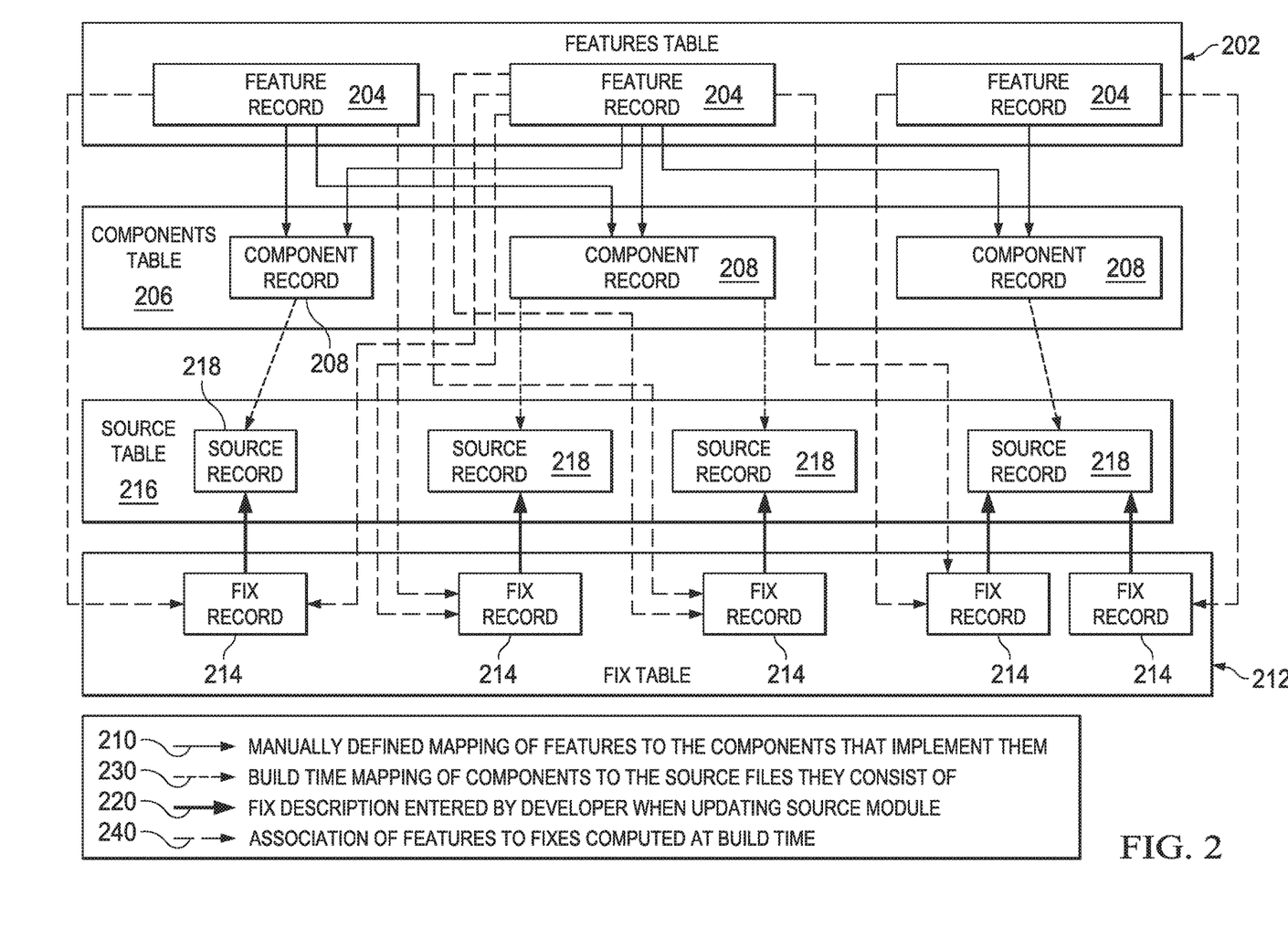
FIG. 2 illustrates a diagram depicting a process for building a features-to-fixes correlation database, in accordance with embodiments of the present disclosure.

FIG. 2 illustrates a diagram depicting a process for building features-to-fixes correlation database 126, in accordance with embodiments of the present disclosure. When a firmware update is built by a developer, characterization data for all of the fixes may be collected and collated. The process of collating may associate each component (e.g., library, daemon, executable, etc.) to the fixes included within the source code modules used to implement the firmware update. In addition, each feature of an update may be associated with components that make up such feature.

When a particular information handling resource is defined or updated, a developer may create a features table 202 of one or more feature records 204 of features supported by the information handling resource. A developer may also create a components table 206 of one or more component records 208 setting forth all components (e.g., daemons, libraries, drivers, configuration files, etc.) for the information handling resource, and then create associations 210 between each feature record 204 and component record 208 based on which components make up which features.

When a developer makes a fix to firmware, the developer may create a fix record 214 of a fixes table 212 and create an association 220 between the fix record 214 and one or more source records 218 of a source table 216 for source code affected by the fix. In some embodiments, a fix record 214 may include information regarding the fix, including a description of a criticality of the fix, a type of issue fixed by the fix, hardware impacted by the fix, and/or other information.

Accordingly, during build time of a firmware update, build streams may analyze associations 230 between source records 218 and component records 208. Based on such information, the build stream for the update may generate associations 240 of feature records 204 to fix records 214. Features table 202, fixes table 212, and associations 240 may thus be used to generate features-to-fixes correlation database 126, which itself may be included within a firmware build or firmware update.

FIG. 3 illustrates a block diagram of an example usage database 128, in accordance with embodiments of the present disclosure. As shown in FIG. 3, usage database 128 may include one or more feature records 302 (e.g., 302a, 302b, . . . , 302N) and one or more hardware records 310 (e.g., 310a, 310b, . . . , 310N). A feature record 302 may include data regarding a particular feature that may be used by one or more information handling resources. As shown in FIG. 3, a feature record 302 may include an enable flag 304 indicating whether a feature is enabled or disabled, a timestamp 306 which may indicate a time at which the feature was most-recently used, and a usage frequency variable 308 indicative of a frequency of which the feature is used. A hardware record 310 may include data regarding a particular information handling resource present in information handling system 102. For example, in some embodiments, the presence of a hardware record 310 may indicate presence of the corresponding information handling resource, while the absence of a hardware record 310 may indicate absence of the corresponding information handling resource.

In operation, management controller 112 may build and maintain usage database 128. For example, upon an initialization of management controller 112, each feature may be marked as enabled or disabled by setting an appropriate value for enable flag 304 for each feature record 302. In addition, upon an initialization of management controller 112, all existing hardware records 310 may be deleted and new hardware records 310 may be created for each of one or more information handling resources present in information handling system 102.

When an end user modifies a configuration setting to enable or disable a feature, management controller 112 may modify enable flag 304 of the appropriate feature record 302. Also, when a user or external application makes use of a feature, management controller 112 may update timestamp 306 and usage frequency variable 308 of the feature record 302 associated with the feature. In addition, if hardware is removed or added during runtime of management controller 112, a new hardware record 310 may be added or an existing hardware record 310 may be deleted, as appropriate.

Figure 4:
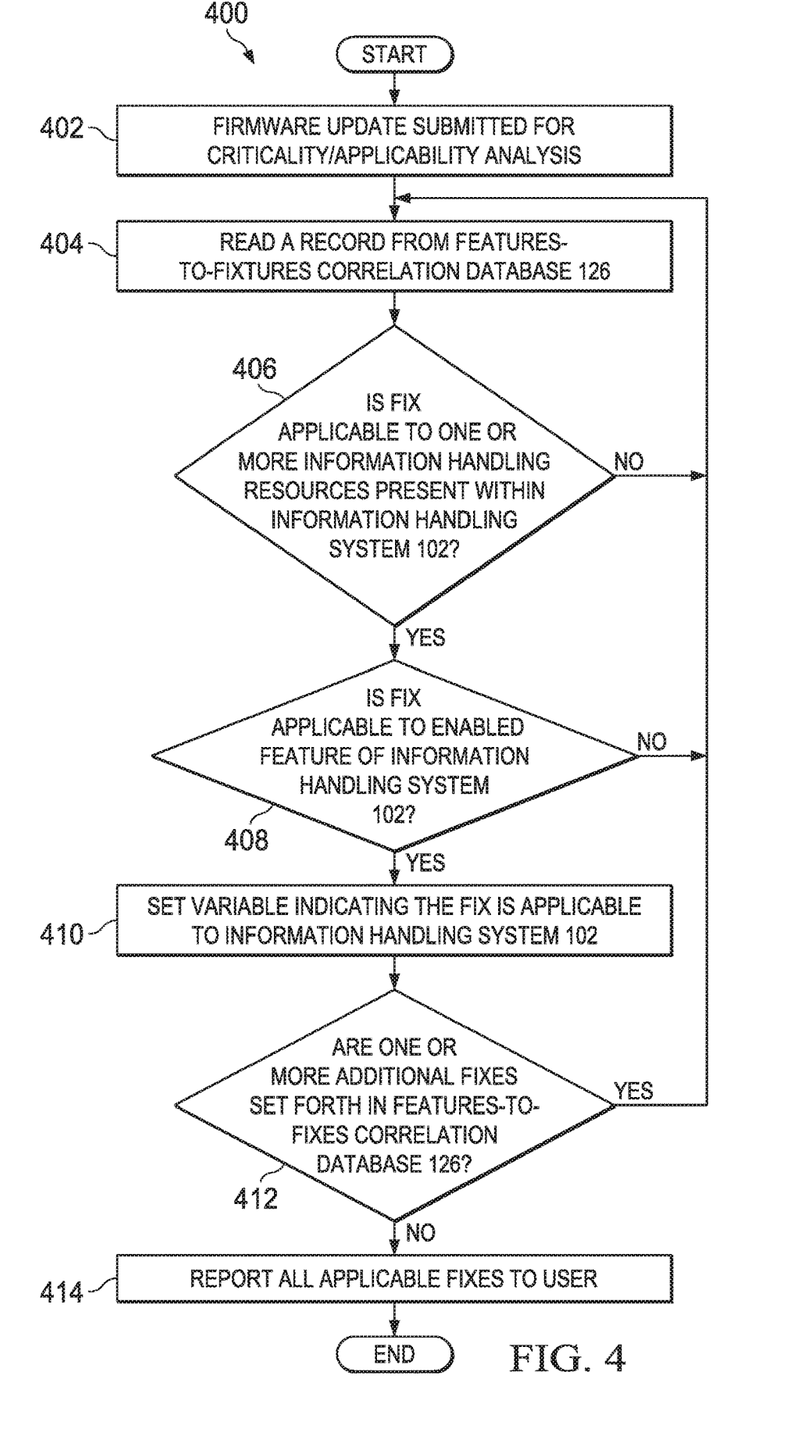
FIG. 4 illustrates a flowchart of an example method for usage driven determination of firmware update criticality, in accordance with embodiments of the present disclosure.

FIG. 4 illustrates a flowchart of an example method 400 for usage driven determination of firmware update criticality, in accordance with embodiments of the present disclosure. According to certain embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, a user may submit a firmware update for criticality/applicability analysis. At step 404, management controller 112 may read a record in features-to-fixtures correlation database 126. At step 406, management controller 112 may read usage database 128 to determine if the fix for the record is applicable to one or more information handling resources actually present within information handling system 102. If one or more information handling resources are present to which the fix is applicable, method 400 may proceed to step 408. Otherwise, in no information handling resources are present to which the fix is applicable, method 400 may proceed again to step 404.

At step 408, management controller 112 may read usage database 128 to determine if the fix for the record is applicable to an enabled feature of information handling system 102. If one or more features are enabled to which the fix in applicable, method 400 may proceed to step 412. Otherwise, in no features are enabled to which the fix is applicable, method 400 may proceed again to step 404.

At step 410, responsive to determining the fix is applicable to at least one enabled feature of at least one information handling resource, a variable associated with the fix may be set indicating the fix is applicable to information handling system 102.

At step 412, management controller 112 may determine if one or more additional fixes are set forth in features-to-fixes correlation database 126. If additional fixes are present in features-to-fixes correlation database 126, method 400 may proceed again to step 404. Otherwise, method 400 may proceed to step 414.

At step 414, management controller 112 may report all applicable fixes to a user. In some embodiments, such applicable fixes may be displayed along with an indicator of criticality of the fixes. In these and other embodiments, such applicable fixes may be displayed along with an indication of the type or types of fixes (e.g., security, performance, stability, functionality, etc.). Such report may be used by a user to determine which firmware updates to apply to information handling system 102 and/or may be used by an executable program to determine which firmware updates to apply. After completion of step 414, method 400 may end.

Although FIG. 4 discloses a particular number of steps to be taken with respect to method 400, it may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, components thereof or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a host system comprising a host system processor; and
a management controller communicatively coupled to the host system processor and configured to provide management of the information handling system and further configured to:
accessing a features-to-fixes database having one or more entries, each entry of the features-to-fixes database setting forth an association between a feature of an information handling resource and one or more firmware fixes, wherein the accessing of the features-to-fixes database includes:
building a features table associated with an information handling resource, wherein the features table includes one or more feature records wherein each of the one or more feature records indicates a corresponding feature supported by the information handling resource;
building a components table associated with the information handling resource wherein the components table includes one or more component records, wherein each of the one or more component records indicates a corresponding component of the information handling resource;
identifying associations between the one or more feature records and the one or more component records;
creating a fix record pertaining to a firmware fix for the information handling system;
creating associations between the fix record and one or more source records, wherein the one or more source records indicate source code affected by the firmware fix;
accessing information indicative of associations between the one or more source records and the one or more component records; and
generating associations between the one or more feature records and the fix record;
accessing a usage database having one or more entries, each entry of the usage database setting forth usage of a feature of information handling resource by the information handling system;
compare entries of the features-to-fixes database and the usage database to determine a criticality of the one or more firmware fixes such that a first of the firmware fixes has a first determined criticality, and a second of the firmware fixes has a second, different determined criticality; and
transmit a report indicative of the criticality of the one or more firmware fixes, the report including an indication of the first criticality and the second criticality.

2. The information handling system of claim 1, wherein the usage database comprises one or more feature records, each feature record setting forth information regarding whether an information handling resource feature associated with the feature record is enabled for use on the information handling system.

3. The information handling system of claim 1, wherein the usage database comprises one or more feature records, each feature record setting forth information regarding a usage frequency of an information handling resource feature associated with the feature record.

4. The information handling system of claim 1, wherein the usage database comprises one or more hardware records, each hardware record indicative of a presence within the information handling system of an information handling resource associated with the hardware record.

5. The information handling system of claim 1, wherein creating associations between the one or more feature records and the one or more component records includes creating associations indicative the one or more components corresponding to each of the one or more features.

6. The information handling system of claim 1, wherein the fix record includes information indicative of a criticality of the firmware fix.

7. A method comprising:
accessing a features-to-fixes database having one or more entries, each entry of the features-to-fixes database setting forth an association between an information handling resource feature and one or more firmware fixes, wherein the accessing of the features-to-fixes database includes:

building a features table associated with an information handling resource, wherein the features table includes one or more feature records wherein each of the one or more feature records indicates a corresponding feature supported by the information handling resource;

building a components table associated with the information handling resource wherein the components table includes one or more component records, wherein each of the one or more component records indicates a corresponding component of the information handling resource;

identifying associations between the one or more feature records and the one or more component records;

creating a fix record pertaining to a firmware fix for the information handling system;

creating associations between the fix record and one or more source records, wherein the one or more source records indicate source code affected by the firmware fix;

accessing information indicative of associations between the one or more source records and the one or more component records; and generating associations between the one or more feature records and the fix record;

reading a usage database having one or more entries, each entry of the usage database setting forth usage of information handling resource features by an information handling system;

comparing entries of the features-to-fixes database and the usage database to determine a criticality of the one or more firmware fixes to the information handling system such that a first of the firmware fixes has a first determined criticality, and a second of the firmware fixes has a second, different determined criticality; and transmitting a report indicative of the criticality of the one or more firmware fixes, the report including an indication of the first criticality and the second criticality.

8. The method of claim 7, wherein the usage database comprises one or more feature records, each feature record setting forth information regarding whether an information handling resource feature associated with the feature record is enabled for use on the information handling system.

9. The method of claim 7, wherein the usage database comprises one or more feature records, each feature record setting forth information regarding a usage frequency of an information handling resource feature associated with the feature record.

10. The method of claim 7, wherein the usage database comprises one or more hardware records, each hardware record indicative of a presence within the information handling system of an information handling resource associated with the hardware record.

11. An article of manufacture comprising:

a non-transitory read-only computer-readable medium; and computer-executable instructions stored on the non-transitory read-only computer-readable medium, the instructions readable by a processor, and the instructions, when read and executed, for causing the processor to:

access a features-to-fixes database having one or more entries, each entry of the features-to-fixes database setting forth an association between an information handling resource feature and one or more firmware fixes wherein the accessing of the features-to-fixes database includes:

building a features table associated with an information handling resource, wherein the features table includes one or more feature records wherein each of the one or more feature records indicates a corresponding feature supported by the information handling resource;

building a components table associated with the information handling resource wherein the components table includes one or more component records, wherein each of the one or more component records indicates a corresponding component of the information handling resource;

identifying associations between the one or more feature records and the one or more component records;

creating a fix record pertaining to a firmware fix for the information handling system;

creating associations between the fix record and one or more source records, wherein the one or more source records indicate source code affected by the firmware fix;

accessing information indicative of associations between the one or more source records and the one or more component records; and generating associations between the one or more feature records and the fix record;

access a usage database having one or more entries, each entry of the usage database setting forth usage of information handling resource features by an information handling system;

compare entries of the features-to-fixes database and the usage database to determine a criticality of the one or more firmware fixes to the information handling system such that a first of the firmware fixes has a first determined criticality, and a second of the firmware fixes has a second, different determined criticality; and transmit a report indicative of the criticality of the one or more firmware fixes, the report including an indication of the first criticality and the second criticality.

12. The article of claim 11, wherein the usage database comprises one or more feature records, each feature record setting forth information regarding whether an information handling resource feature associated with the feature record is enabled for use on the information handling system.

13. The article of claim 11, wherein the usage database comprises one or more feature records, each feature record setting forth information regarding a usage frequency of an information handling resource feature associated with the feature record.

14. The article of claim 11, wherein the usage database comprises one or more hardware records, each hardware record indicative of a presence within the information handling system of an information handling resource associated with the hardware record.

* * * * *